United States Patent [19]

Taylor

[11] 4,020,923
[45] May 3, 1977

[54] ENERGY STORAGE APPARATUS

[76] Inventor: Robert N. Taylor, P.O. Box 5395, Port Arthur, Tex. 77640

[22] Filed: Dec. 19, 1975

[21] Appl. No.: 642,314

Related U.S. Application Data

[63] Continuation-in-part of Ser. No. 480,967, June 19, 1974, abandoned.

[52] U.S. Cl. .................................................. 185/11
[51] Int. Cl.² .......................................... F03G 1/00
[58] Field of Search ............... 185/11, 13, 40 R, 43

[56] References Cited

UNITED STATES PATENTS

| | | | |
|---|---|---|---|
| 1,271,437 | 7/1918 | Colbert | 185/11 |
| 1,365,724 | 1/1921 | Phillips | 185/40 R |

FOREIGN PATENTS OR APPLICATIONS

| | | | |
|---|---|---|---|
| 680,012 | 1/1930 | France | 185/40 R |
| 251,002 | 4/1926 | United Kingdom | 185/40 R |

*Primary Examiner*—Allan D. Herrmann
*Attorney, Agent, or Firm*—Arnold, White & Durkee

[57] ABSTRACT

An energy storage system having several units for transmitting input power from electric motors to an output shaft, each of the units involving an electric motor, a main gear rotatable in response to operation of the motor, a flat spiral spring secured to the main gear for storing energy when the main gear is rotated by the motor, a device by which the main gear may selectively engage and rotate an output driveshaft when the flat spiral spring rotates the main gear, and a motor control switch that may be engaged by the spring, for sensing the contraction and expansion of the spring, and for activating and deactivating the motor in response to preselected positions of the spring's contraction and expansion.

7 Claims, 5 Drawing Figures

ENERGY STORAGE APPARATUS

RELATED APPLICATION

This application is a continuation-in-part of an application by the same inventor, Ser. No. 480,967, filed June 19, 1974, now abandoned.

BACKGROUND OF THE INVENTION

This invention relates to energy storage systems and devices, more particularly, to machines used for storing and transmitting energy from input sources, typically rotating shafts powered by electric or other motors, the storage and transmittal function being accomplished by means of springs.

Various systems have been long in existence which used prewound or continually rewound springs to drive an output power shaft connected to driven equipment, for example, an electrical generator. Some involve multiple units each having a spring or springs which, after being wound or released, drive gears which in turn rotate the main shaft. Others have peripheral springs around a main gear or inside a ring gear rotating on a main shaft; the peripheral springs drive small spring gears which in turn drive a larger gear secured to the main shaft.

Such a device should desirably be continually operable (assuming ample input power), speed-controllable, and have its individual spring units synchronizable to operate sequentially for the required output power and speed needs. Such desired characteristics are generally lacking in the prior art devices.

For example, in Vigneri U.S. Pat. No. 2,345,954, peripheral springs are wound individually, and a brake on the main shaft is then released. An arm mounted on the main shaft rotates a rack to rewind the springs one at a time. The disadvantages of such a system are the need for a brake while the springs are hand wound (or otherwise) in advance, and the need for spring gears to be individually wound by the rack.

In Rutzen U.S. Pat. No. 1,178,947, a ring gear rotates the spring gears, and in turn winds the springs, one at a time. In Rutzen U.S. Pat. No. 1,178,952, the ring gear has rack-like segments thereon that rotate the spring gears, and in turn wind the springs, again one at a time and sequentially. The undersirability of these systems is the need for segmental racks and spring gears.

In Rutzen U.S. Pat. No. 641,799, a main shaft rotates and turns a countershaft that winds the spring attached to the central shaft, a brake being required to prevent the central shaft from turning when the spring is rewinding; the obvious disadvantage is the need for the brake.

In Zippel U.S. Pat. No. 1,481,279, right and left springs are wound by the same motor, one at a time--a clutch is used to connect the winding means (powered by an electric motor) to each spring winding shaft. The solenoid moves the clutch control switch on the spring to actuate the clutch. The obvious disadvantage of this system is the complicated clutching equipment.

In Joyner U.S. Pat. No. 1,776,360, peripheral springs are wound by tappets or a cam that turns the spring gears, and in turn winds the springs. The obvious disadvantage of this system is the need for the tappets or the cam, as well as the spring gears. In Joyner U.S. Pat. No. 1,833,838, multiple springs are wound by rotatable spring shafts interconnected by chains, flat spiral springs being attached to drums and shafts, the final unit being connected to an output driveshaft. The apparent disadvantage of this system is the mechanical interconnection between spring units.

In Johnston U.S. Pat. No. 487,745, flat spiral springs are employed with several clutches——the shortcoming being the need for clutches.

Spring motors thus take on various designs, all with the objective of transmitting the power from the wound spring to an outward driveshaft, some machines using prewound springs, others employing various types of rewinding mechanisms and motors. The springs used in such devices are typically of the flat spiral variety having an inner end secured to a shaft, and an outer end secured to a fixed frame member or a portion of the housing if the inner shaft is rotatable, or to a rotating drum mounted on the inner shaft if the shaft is not rotatable.

The previously described units typify those that have been made and used in the past, and evidence the apparent need for a multi-unit system wherein the spring units are optionally synchronizable or independently operable, without need for complicated rack-type spring winders or other peripheral spring gears or controllable clutches. The subject invention provides such a system.

SUMMARY OF THE INVENTION

The invention is an energy storage system having a plurality of units for transmitting input power from rotating shafts of electric motors to an output driveshaft, and has several units within a single frame or housing. In each unit, there is an electric motor mounted therein, a flat spiral spring having one end secured to a main gear which, when rotated in response to the electric motor, stores energy for rotating the driveshaft, means for selectively engaging the driveshaft with the main gear, and a motor control switch that is engageable with and responsive to the spring, for sensing the contraction and expansion of the spring, and for activating and deactivating the motor in response to preselected positions on the spring's contraction and expansion. The main gear in the system is rotatable in response to the motor by means of a ratchet pinion gear which drives the main gear in one direction and isolates the motor from rotation of the main gear in the opposite direction. Likewise, the output shaft is selectively engaged and rotated by a ratchet drive gear which drives the output shaft when the main gear is rotating in one direction, and isolates the output shaft from rotation when the main gear is rotating in the other direction. The system also includes a spring overrun preventer that is responsive to the motor control switch to prevent the spring from unwinding beyond the range of expansion that produces useful power, and especially to eliminate the possibility of the spring becoming totally unwound. The various units of the system may be operated sequentially to engage the output shaft in proper sequence, or may be operated independently of each other.

DESCRIPTION OF THE PREFERRED EMBODIMENT

The subject invention comprises an energy storage system having a plurality of units mounted in a single frame, each unit having an electric motor for winding and rewinding a flat sprial spring secured to a main gear that is rotated by a pinion gear on the shaft of the electric motor. As the spring is wound, it contracts tightly. When it reaches a preselected point of contraction, the motor is cut off, and the spring is allowed to unwind, thereby rotating the main gear, and in turn the output driveshaft. When the spring has substantially unwound and thus has expanded to a preselected position, the switch is tripped again to activate the electric motor, and the spring is rewound by the rotation of the motor. No clutches or brakes are needed for operation of the system, since ratchet drive gears are employed on the electric motor shaft and on the output driveshaft. A brake is, however, used as a spring overrun preventer, to prevent the spring's momentum from unwinding the spring beyond the range of expansion which can produce useful power, thus eliminating the necessity for rewinding through this range. The brake also can retain the spring in a partially wound condition when the machine is not in use.

Figure 1:
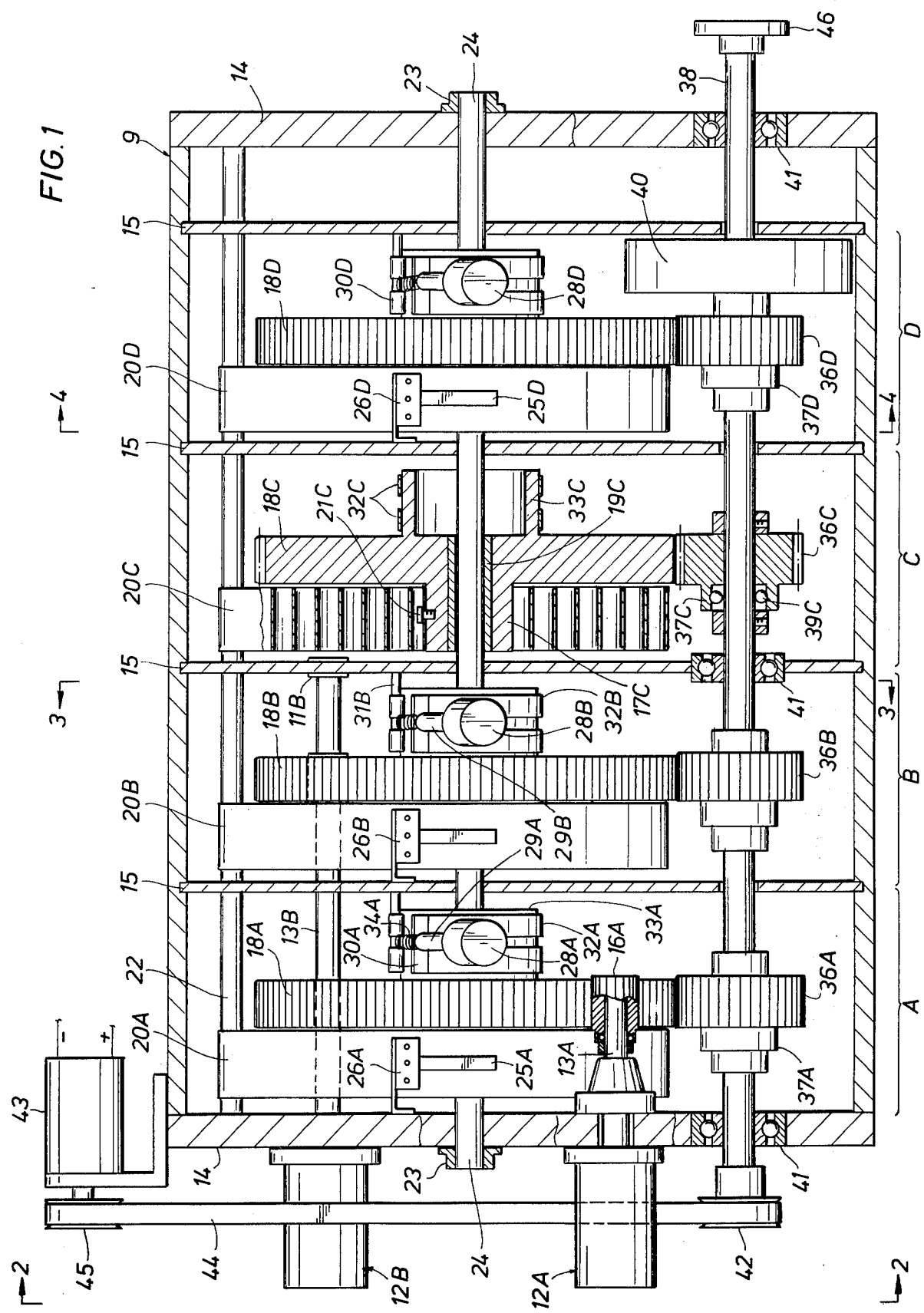
FIG. 1 is an overall side view of the preferred embodiment of the invention.

For simplicity, the description of the preferred embodiment will identify by number the various parts of each of the four units, but the various units may be differentiated by the suffix letters A, B, C, and D after the identifying part numbers. The four units of the illustrated embodiment are, from left to right in FIG. 1, A, B, C, and D, and are in some aspects identical. Accordingly, at times reference may be had to a component in the "A" unit only, and it will be apparent from the drawings that a similar component is utilized in the other units.

Figure 2:
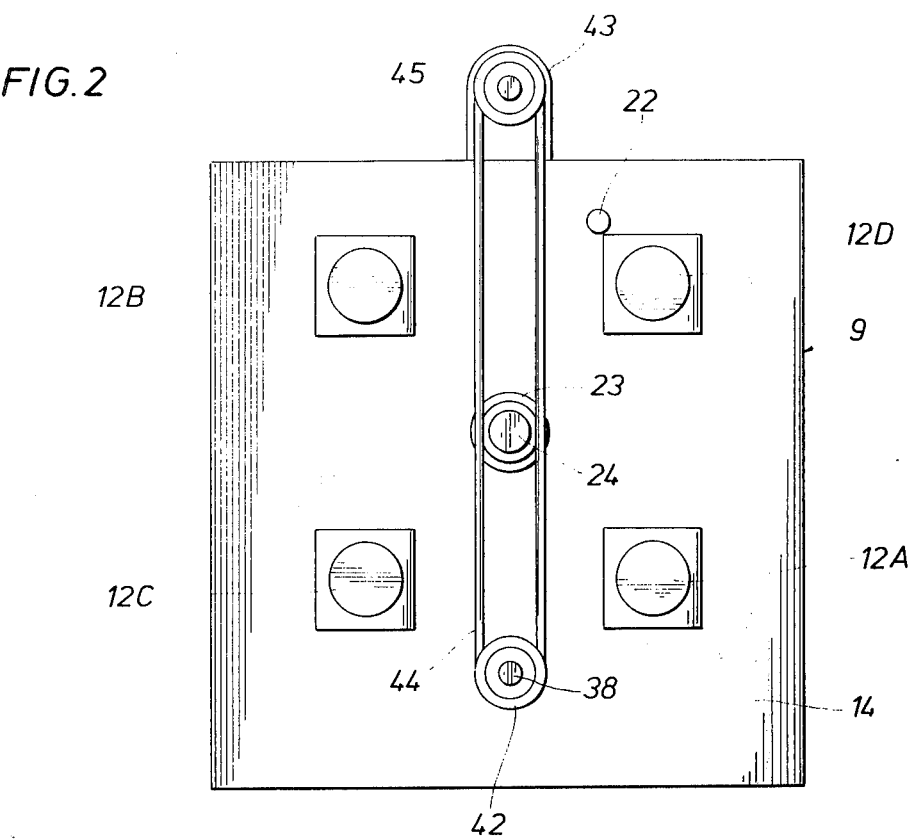
FIG. 2 is an end view of the embodiment shown in FIG. 1, showing the electric starter motors and a drive belt connected to the drive shaft and a belt-driven electric generator.
Figure 5:
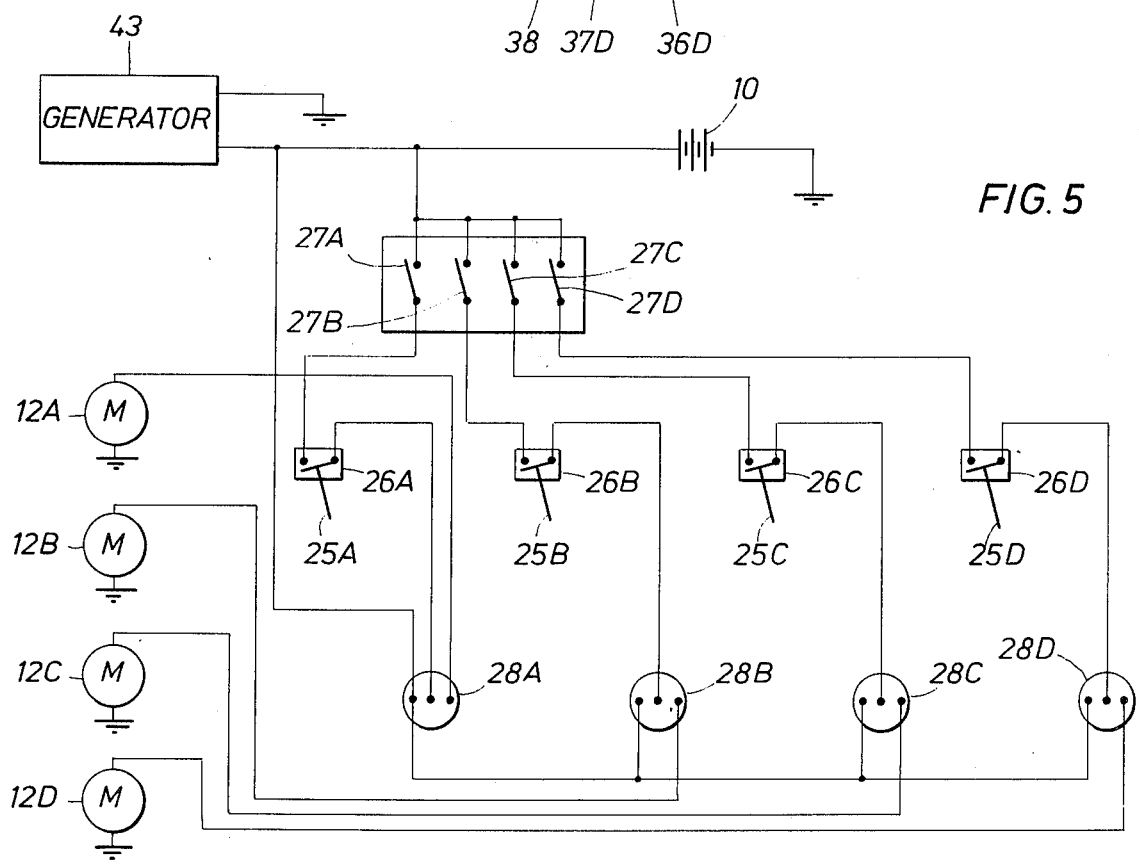
FIG. 5 is a schematic diagram showing the electrical wiring of the embodiment shown in FIG. 1.

The preferred embodiment of the apparatus is electrically powered, input power coming from a battery 10 shown in the schematic FIG. 5. The battery is not shown in FIG. 1, but powers the electric motors 12A-D, all of which are shown in the end view of FIG. 2. The wiring for the apparatus is not shown in FIG. 1, but a schematic diagram of the wiring is shown in FIG. 5. The electric motors are mounted in a side member 14 of the frame 9 of the unit, and the shaft 13A of the motor 12A has mounted on it a ratchet pinion gear 16A. For those members with extended shaft 13B–D, suitable bearings (11B shown) for the motor shafts 13B–D are provided in the internal frame member 15.

The ratchet pinion gear 16A meshes with the main gear 18A, and thereby rotates the main gear 18A when the motor 10A is operating. When the main gear 18A is rotated by the motor 10A, the flat spiral spring 20A, connected to the main gear 18A, is wound and contracts in diameter. The springs 20A–D (front section view shown at 20C, full side view of spring 20D shown in FIG. 4) are connected at their outer ends to an inner frame member 22, actually a round bar in the preferred embodiment, and at their inner ends to the hubs of the respective main gears (17C hub shown) by suitable screws (21C shown), as shown in the side view of the D unit of FIG. 4. The main gears 18A–D are rotatably mounted on the central shaft 24 by bearings or bushings (shown at 19C). The central shaft 24 is securely fastened by brackets 23 in the side members 14 of the frame 9, and also in the several internal frame members 15.

Figure 4:
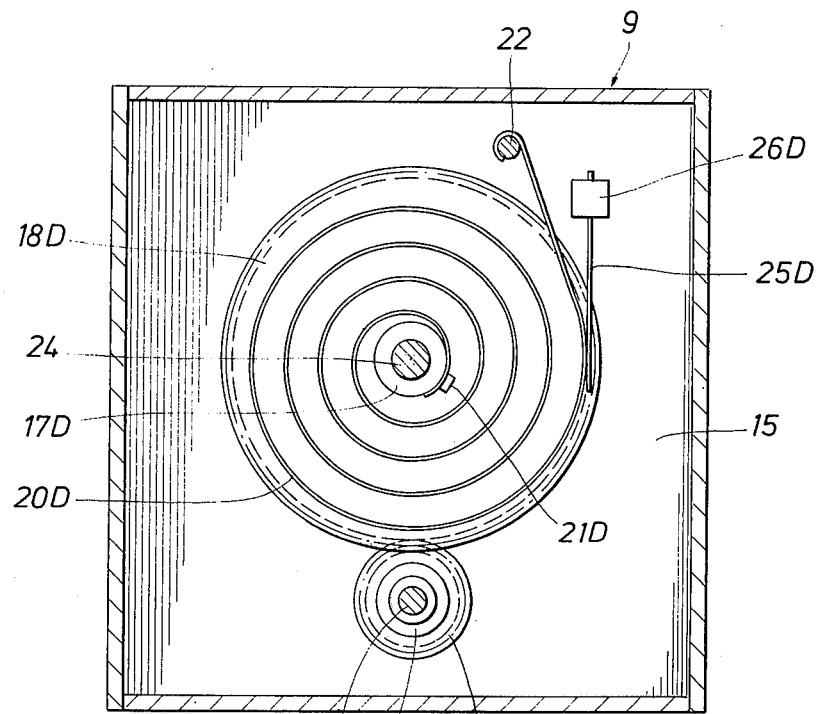
FIG. 4 is a section view of the FIG. 1 embodiment at the location shown in FIG. 1, showing the gears of one unit, the flat spiral spring in a partially coiled position, and also the motor control switch which operates in response to the spring.

The spring 20A, when tightly wound, contracts; likewise, when unwinding, the spring expands to a larger size and diameter. The motor control switch 26A, mounted on the frame side member 14, controls the motor 12A (by means of the solenoid 28A connected to the motor control switch) in response to the expansion and contraction of the flat spiral spring 20A. The motor control switch 26A is also connected in series with a manually controlled switch 27A, as shown in the schematic FIG. 5. The manual switch must be connected for operation of the system. When the spring 20A is of a sufficient expanded diameter to maintain the motor control switch 26A in the on position, the motor 12A is operating, and thus rotating the main gear 18A, and winding the flat spiral spring 20A. When the spring 20A has been contracted to a predetermined point, the switch 26A switches to the off position, turning the motor 12A off, at which time the spring 20A begins to unwind. A ratchet (not shown) on the shaft 13A between motor 12A and the gear 16A permits gear 16A to respond to the rotation of the main gear 18A caused by the unwinding spring without causing counter-rotation in the motor 12A. When the spring 20A is unwound to a predetermined level, the motor control switch 26A again activates the solenoid 28A, which switches the motor 12A on to repeat the rewinding-unwinding cycle. FIG. 4 shows the motor control switch 26D with the switch arm 25D resting on the spring 20D.

Figure 3:
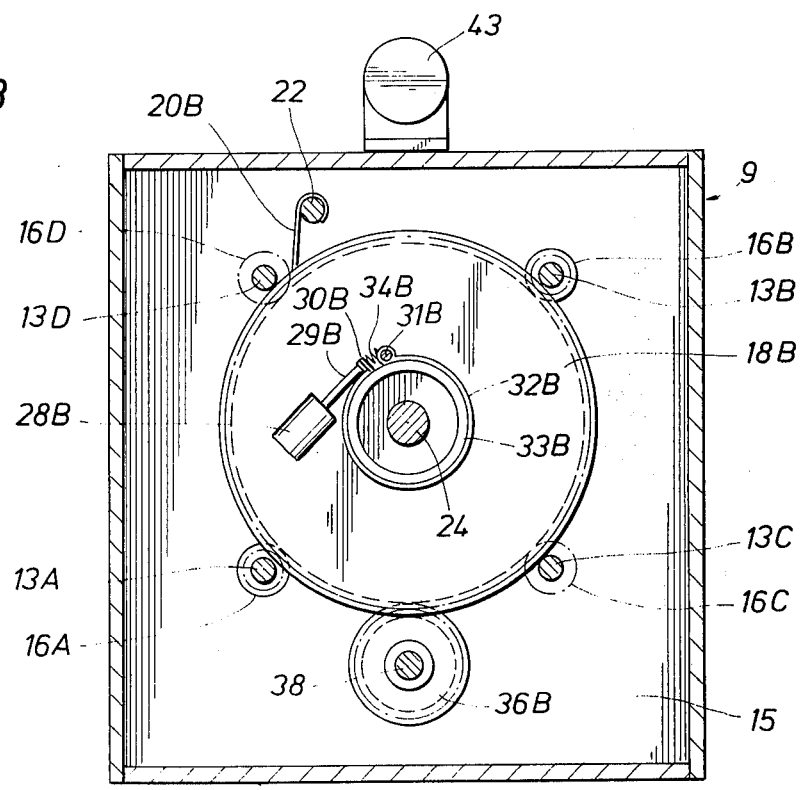
FIG. 3 is a section view to the FIG. 1 embodiment at the location shown in FIG. 1, showing various gears of the unit, and also a solenoid-operated mechanism to prevent excessive spring unwinding.

The main gear 18A meshes with, in addition to the ratchet pinion gear 16A attached to the motor shaft 13A, which is driven only during the unwinding mode of the spring, the output-drive ratchet gear 36A. FIG. 3 shows the meshing of the main gear 18B with the pinion gear 16B and the drive gear 36B, while FIG. 4 shows the meshing of the main gear 18D and the drive gear 36D (pinion gear 16D not shown). When the spring 20A is in the unwinding mode (motor control switch 26A in off position), and is thus rotating the main gear 18A, the output drive ratchet gear 36A causes the driveshaft 38 to rotate. The ratchet shown at 39C isolates the driveshaft from the main gear during the winding operation. The driveshaft is rotatably mounted in the side members 14 of the frame 9, and also in at least one inner frame member 15, by suitable bearings 41. The driveshaft 38 maintains speed and momentum by means of a flywheel 40 mounted thereon. A power takeoff 46 and a belt pulley 42 may be mounted on the ends of the driveshaft 38, the belt pulley 42 having on it a belt 44 looped to a device requiring input power, such as an electrical generator 43, shown in FIGS. 1, 2, and schematic FIG. 5.

When the main gear 18A is being driven by the motor 12A via the ratchet pinion gear 16A, the output drive ratchet gear 36A, being meshed with the main gear 18A, also rotates, but the driveshaft 38 is not affected, because the output-drive ratchet gear 36A is attached to the driveshaft 38 by a conventional ratchet arrangement (similar to the ratchets used on the motor shafts 13A–D) in the hub 37A of the output drive ratchet 36A (ratchet mechanism for unit C is shown at 39C). The ratchet shown at 39C operates by centrifugal force throwing the balls outward against the inner wall of the hub 37C. The inner wall is not concentric about the shaft 38, but rather has a variable radius of curvature, to allow the balls to tighten against the hub and the shaft, and thereby rotate the driveshaft 38 when the drive gear 36C is rotated in one direction, and to allow the balls to remain free and thereby not rotate the drive shaft 38 when the drive gear 36C is rotated in the other direction. Other suitable ratchet arrangements are well known.

When the main gear 18A is rotated by the unwinding action of the spring 20A in its unwinding mode, thereby driving the output-drive ratchet gear 36A, and in turn the driveshaft 38, the ratchet pinion gear 16A on the shaft 13A of the motor 12A, while rotating because it is meshed with the main gear 18A, does not rotate the shaft 13A, because the ratchet pinion gear 16A is also mounted on the shaft 13A by means of a conventional ratchet arrangement in the hub of the ratchet pinion gear 16A.

Solenoid 28A (side view of solenoid 28B shown in FIG. 3) has two functions: switch the electric motor 12A on and off, and release and apply the spring overrun preventer 30A. Any suitable switch mechanism will suffice; a solenoid is used in the preferred embodiment because the switches 26A–D cannot carry the current required by the motors 12A–D. If a switch large enough to carry this current were used, no solenoid would be needed to switch the motor on and off, but would be necessary to release and apply the spring overrun preventer. The spring overrun preventer (FIGS. 1 and 3) is, in the preferred embodiment, a strap 32A around a drum 33A, which is securely fastened to the main gear 18A. The spring overrun preventers 30A–D are secured to a mounting rod shown at 31B on an inner frame member 15, and are applied by means of coil springs shown at 34A, which, when the solenoids 28A–D are in the motor-off position, hold the straps 32A–D tightly on the respective drums 33A–D attached to the respective main gears 18A–D. The function of the spring overrun preventer is to eliminate the possibility of the spring 20A completely unwinding near the end of an unwinding cycle, and especially to prevent the complete unwinding when the system is shut down by switching off the manual control switch 27A. The action of the solenoid shaft or piston 29A of the solenoid 28A, when the motor-on position, releases the spring overrun preventer 30A by freeing the drum 33A from the strap 32A. The action of the solenoid piston 28A (28B shown in FIG. 3) thus starts and stops the rewind motor 12A, and releases and applies the strap 32A on the drum 33A.

Whenever the motor 12A is engaged by the solenoid 28A as a result of the motor control switch 26A being in the motor-engaged position, the spring overrun preventer 30A is released, thereby completely freeing the main gear 18A to rotate freely, powered by the unwinding action of the spring 20A. Likewise, when the motor 12A is disengaged by the solenoid 28A as a result of the motor control switch 26A being in the motor-disengaged position, the spring overrun preventer is applied to prevent the spring from unwinding completely.

The four units A, B, C, and D may be operated sequentially or independently. For sequential operation, the winding mode of each unit must be keyed to the unwinding mode of the previous unit, unit A being keyed to unit D. To do this, a three-way switch may be used in lieu of the conventional switch shown in the schematic diagram of FIG. 5, which illustrates the circuitry for independent operation of the four units. All manual switches 27A–D and motor control switches 26A–D are shown in the off position. The motor for a particular unit is engaged when both the manual switch (hand operated) and the motor control switch (responsive to the spiral spring) are in the on position, the solenoid activating the motor in response to the motor control switch. For independent operation, the winding and rewinding modes are not dependent on the operating mode of any particular units in the system. For sequential operation, alternative units may be sequentially rewound and unwound, by keying the operation of the rewinding motors 12A–D to the operating mode of the previous unit, through the switches 26A–D. By either mode of operation, the driveshaft may be continuously rotated by the energy stored in and given off by the springs.

In view of the preceding description of a particular preferred embodiment, further modifications and alternative embodiments of this invention may be apparent to those skilled in the art. Accordingly, the preceding description is to be construed as explanatory and illustrative only, and is for the purposes of teaching and enabling those skilled in the art to make and use the invention. The preferred embodiment of the invention shown and described herein is to be understood to be the best mode presently contemplated, but is by no means the only embodiment possible. Various changes may be made in the mere shape, size, or arrangement of parts. Parts may be reversed, and equivalent elements may be substituted for those illustrated and described herein. For example, the spring overrun preventer may be designed with internal shoes opening against an outer drum, or the spiral spring may be secured to the inside of a rotating drum, and to a fixed shaft on which the drum rotates. The following claims are intended to cover all such equivalent modifications and variations that fall within the true spirit and scope of the invention.

What is claimed is:

1. An energy storage apparatus having a plurality of units for transmitting input power from electric motors to an output shaft, each unit comprising:
   a frame;
   an electric motor mounted in said frame;
   a main gear rotatable in response to said motor;
   a flat spiral spring having one end secured to said main gear, for storing energy upon rotation of said main gear;
   means for selectively engaging an output shaft with said main gear; and
   a motor control switch engageable with said spring for sensing the contraction and expansion of said spring and for activating and deactivating said motor in response to preselected positions of contraction and expansion of said spring.

2. The apparatus of claim 1, wherein said motor drives said main gear in one direction, and is isolated from the rotation of said main gear in the opposite direction.

3. The apparatus of claim 1, including a ratchet pinion gear engaging said main gear for rotating said main gear in response to the rotation of said motor.

4. The apparatus of claim 1, wherein said output shaft is rotated in response to the rotation of said main gear in one direction, and is isolated from the rotation of said main gear in the opposite direction.

5. The apparatus of claim 2, including a ratchet drive gear engagable by said main gear, for rotating said output shaft in response to rotation of said main gear in said opposite direction.

6. The apparatus of claim 1, including a spring-overrun preventer responsive to said motor control switch, to prevent said spring from unwinding beyond the range of expansion that produces useful power.

7. The apparatus of claim 1, wherein said springs are sequentially wound and unwound.

* * * * *